(12) United States Patent
Troan et al.

(10) Patent No.: US 8,468,328 B2
(45) Date of Patent: *Jun. 18, 2013

(54) SYSTEM AND METHOD FOR VERIFYING COMPATIBILITY OF COMPUTER EQUIPMENT WITH A SOFTWARE PRODUCT

(75) Inventors: Lawrence Edward Troan, Raleigh, NC (US); Robin Joel Landry, Apex, NC (US); David Keith Lawrence, Apex, NC (US); Willard Gordon Woods, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 731 days.

This patent is subject to a terminal disclaimer.

(21) Appl. No.: 12/629,421

(22) Filed: Dec. 2, 2009

(65) Prior Publication Data

US 2010/0100772 A1    Apr. 22, 2010

Related U.S. Application Data

(63) Continuation of application No. 10/906,302, filed on Feb. 14, 2005, now Pat. No. 7,640,423.

(51) Int. Cl.
*G06F 9/24* (2006.01)

(52) U.S. Cl.
USPC ................................ 713/1; 713/2; 713/100

(58) Field of Classification Search
USPC .................. 713/1, 2, 100; 702/117, 119, 123
See application file for complete search history.

(56) References Cited

U.S. PATENT DOCUMENTS

| 6,366,876 B1 | 4/2002 | Looney |
| 6,711,676 B1 | 3/2004 | Zomaya et al. |
| 6,779,134 B1 | 8/2004 | Laviolette et al. |
| 7,640,423 B2 | 12/2009 | Troan et al. |
| 2002/0059214 A1 | 5/2002 | Shibusawa et al. |
| 2002/0104042 A1* | 8/2002 | Wong et al. ..................... 714/38 |
| 2003/0167354 A1 | 9/2003 | Peppers et al. |
| 2003/0204784 A1 | 10/2003 | Jorapur et al. |
| 2004/0073890 A1 | 4/2004 | Johnson et al. |
| 2004/0117413 A1 | 6/2004 | Brown et al. |
| 2004/0128651 A1 | 7/2004 | Lau et al. |

OTHER PUBLICATIONS

Red Hat, Inc., EP Partial European Search Report dated Aug. 30, 2010, 6 pages.
Red Hat, Inc., European Patent Office, Extended European Search Report issued for Application No. 05026240.1, dated Jan. 7, 2011, 13 pages.

(Continued)

*Primary Examiner* — Paul Yanchus, III
(74) *Attorney, Agent, or Firm* — Steven B. Phillips; Moore & Van Allen PLLC

(57) ABSTRACT

System and method for verifying compatibility of computer equipment with a software product. A system and method are provided to verify compatibility of computer equipment with software. This verification can include gathering information about configurations of the computer equipment, and creating at least one file based on the information. The file or files coordinate testing of the computer equipment. The testing produces results that can be stored and analyzed or evaluated. The results can be contained in a file or a plurality of files. The results provide a description of the configurations in addition to an indication of whether the testing has produced any failures. The configuration descriptions or parts thereof can be stored in a configuration database that can be used to apply credit against future testing of computer equipment so that future testing needs can be reduced.

45 Claims, 6 Drawing Sheets

OTHER PUBLICATIONS

USPTO Non-Final Office Action for U.S. Appl. No. 10/906,302 mailed on Apr. 15, 2009.
USPTO Non-Final Office Action for U.S. Appl. No. 10/906,302 mailed on Oct. 20, 2008.
USPTO Non-Final Office Action for U.S. Appl. No. 10/906,302 mailed on Apr. 1, 2008.
Red Hat, Inc., European Patent Application No. 05026240.1, Office Action dated Mar. 26, 2012.
Kok, J., et al., Notes on Constructing a Parallel Computing Platform, JCSC, 2001, pp. 71-80, vol. 17, No. 1.

* cited by examiner

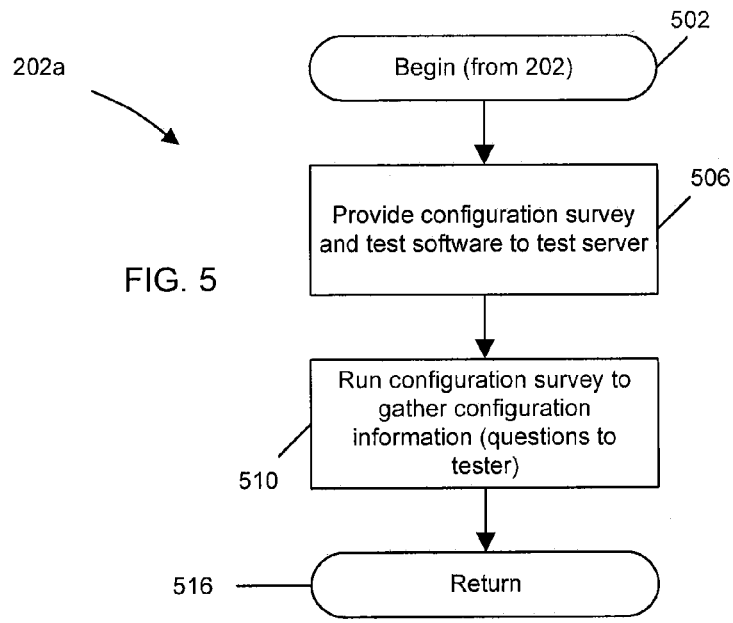
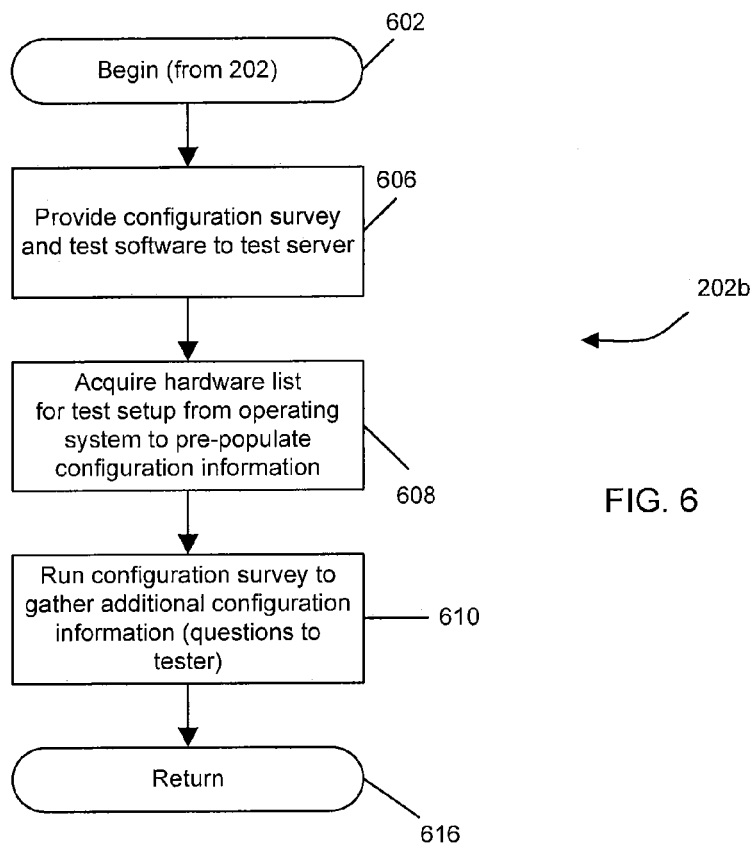

SYSTEM AND METHOD FOR VERIFYING COMPATIBILITY OF COMPUTER EQUIPMENT WITH A SOFTWARE PRODUCT

CROSS-REFERENCE TO RELATED APPLICATION

This application is a continuation of and claims priority from co-pending, commonly assigned application Ser. No. 10/906,302 filed Feb. 14, 2005, the entire disclosure of which is incorporated herein by reference.

BACKGROUND

In the computer industry, it is often necessary to certify or otherwise verify or test specific hardware for compatibility with specific software. For example, a provider of an operating system or other software my wish to indicate to customers or would-be customers what particular models of one or more manufacturer's computer equipment can run a particular version of the software. Testing for compatibility often involves running a suite of tests on the computer equipment. If the computer equipment can be configured many different ways, as is typical with most personal computers, tests can be run against various system configurations.

The variety of configuration options of some types of computing equipment has ballooned due to wide variation in chipsets, peripheral devices, storage devices, and adapters available for use with standard interfaces. Thus, configurations tested do not always account for all of the hardware options. More configurations can be tested, but keeping track of all the various options that are or can be used is sometimes a challenge. In addition, there is often a desire on the behalf of both hardware vendors and software suppliers to limit the testing in some way to gain efficiency, while still maintaining the ability to be reasonably certain as to what configurations will and will not work with a specific software product.

SUMMARY

Exemplary embodiments of the present invention provide a system and method to verify compatibility of computer equipment with a software product. For purposes of illustration, it can be assumed that compatibility of a particular model of personal computer, server, or workstation is being verified relative to a version of an operating system. However, the system and method of the invention can be employed to verify compatibility of any type of computer equipment with any type of software. For instance, an embodiment of the invention may be employed to verify the compatibility of particular adapter cards, peripherals, memory configurations, or the like with an application software product.

In at least some embodiments, a method of verifying compatibility of computer equipment with a software product includes gathering information about at least one configuration of the computer equipment, and creating at least one file based on the information. The file or files can serve to coordinate testing of the computer equipment. The testing produces results that can then be stored and analyzed or evaluated. The results can be contained in a file or a plurality of files. The results provide a description of the configuration or configurations of the computer equipment in addition to whether the testing has produced any failures.

In some embodiments, the method of verifying compatibility can include confirming the description of the computer equipment configuration or configurations with the vendor of the computer equipment. In some embodiments these descriptions or parts of these descriptions are stored in a configuration database with a notation of, or as an indication of having been successfully tested. This configuration database can then be accessed to provide test credit when new models or configurations are being verified, thus reducing the amount of future testing that needs to be done. This credit can be applied during or prior to the testing of a new model or new configuration, or after results have been gathered for analysis, or at any other place in the verification process. Test credit can also be applied based on testing to be done elsewhere, such as by the hardware vendor or a third party.

In some embodiments, a file or files created for the testing can be or include a walkthrough file, which provides instructions to a tester, and a kickstart file or a plurality of kickstart files, which can guide a software installer. The functions of the walkthrough file and a kickstart file can be combined into one file, which can also include the test software. The walkthrough can provide instructions to a tester for configuring the computer equipment for various tests and for booting an installer for each configuration to load the software product for which compatibility is being verified as well as test software. Each kickstart directs the booting of the installer and the loading of test software. In such embodiments, the computer equipment being tested can be repeatedly configured, booted with the appropriate installer, and tested, and each test produces a result which can include a description of the configuration tested. The walkthrough and kickstart files can be generated at least in part by executing a configuration survey which questions a tester about the various possible configurations of the computer equipment to gather this information.

BRIEF DESCRIPTION OF THE DRAWINGS

FIG. 5 is a flowchart illustrating a subroutine for gathering configuration information that can be used with at least one exemplary embodiment of the invention.

FIG. 6 is a flowchart illustrating another subroutine for gathering configuration information that can be used with at least one exemplary embodiment of the invention.

DETAILED DESCRIPTION

The present invention will now be described in terms of specific, exemplary embodiments. It is to be understood that the invention is not limited to the embodiments disclosed. It should also be understood that not every feature of the methods and systems described is necessary to implement the invention as claimed in any particular one of the appended claims. Various elements and features of various embodiments are described to fully enable the invention. Also, throughout the description of the various features and elements of the embodiments disclosed herein, like reference numbers refer to like structures, elements, or processes. It should also be understood that throughout this disclosure where a process or method is shown or described, elements of the method may be invoked in any order or simultaneously, unless it is clear from the context that this cannot be the case. Also, time lags and waiting intervals between various elements or sub-processes of a method can vary.

Figure 1:
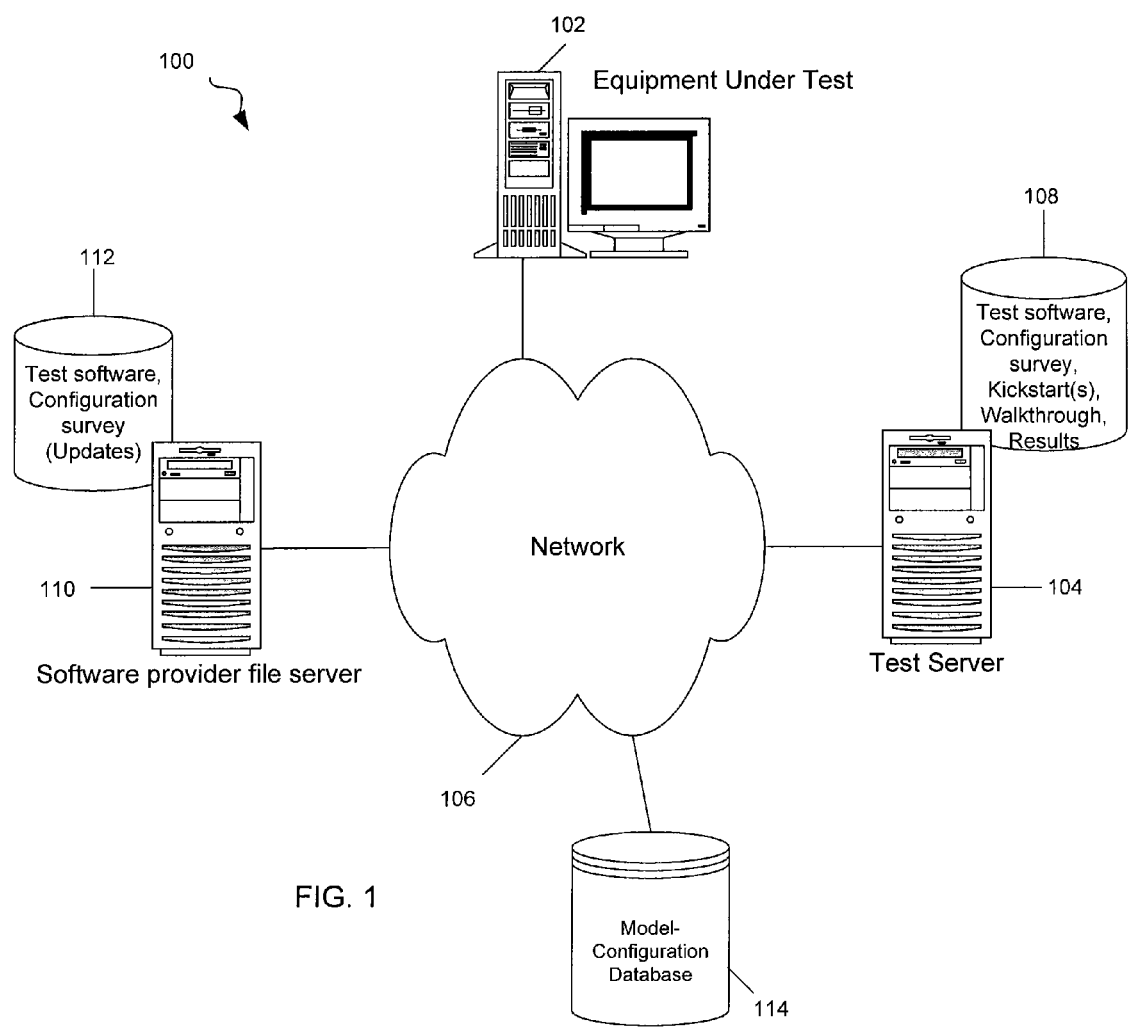
FIG. 1 is a network block diagram which illustrates an exemplary operating environment for at least some embodiments of the invention.

FIG. 1 illustrates a network setup, operating environment, and system of an exemplary embodiment of the present invention. Thus, a discussion of FIG. 1 provides a good context to explain the meaning of some of the terms. System 100 of FIG. 1 includes computer equipment 102, which is the subject of verification testing. Thus, computer equipment 102 can also be referred to as equipment under test (EUT) 102. It can be assumed for purposes of the exemplary embodiments herein that EUT 102 is capable of accepting a wide variety of adapter cards, memory, storage devices, peripherals, and even possibly various central processing unit (CPU) options. EUT 102 is functionally connected to test server 104, via network 106. In the exemplary embodiments disclosed herein, test server 104 manages and coordinates the testing of EUT 102.

Test server 104 of FIG. 1 includes fixed or removable storage, schematically represented by media 108. In this exemplary embodiment, the test server includes test software, a configuration survey, kickstart files, a walkthrough file, and results, which may also be stored in the form of one or more files. The foregoing items resident at test server 104 may be discussed for exemplary purposes as if they are files, and indeed in many embodiments they would be. However, the functions of these various items can be completely or partially combined into one file or included in other software. Also, these items may not all exist on the server at any particular time, but may be created as testing is carried out. For example, a results file may not exist on the test server until at least one hardware configuration of EUT 102 has been tested. Likewise, as will be readily appreciated by those of ordinary skill in the art, it may be that neither kickstart files nor the walkthrough file will exist at test server 104 until the configuration survey has been executed.

For purposes of the exemplary embodiments disclosed herein, test software is any software that tests the hardware of EUT 102. In many cases, this test software will take the form of applications that are retrieved from test server 104 over network 106 and installed on EUT 102. A configuration survey is a list of questions posed to gather configuration information about various configuration options for a model of computer equipment, for which EUT 102 is representative. The configuration survey can be used to gather information about hardware and peripheral options that are not actually present in EUT 102, but that are supported as options by the computer equipment vendor on the model represented by EUT 102. In one exemplary embodiment, the configuration survey is written in a high-level programming language or takes the form of a script. It runs on test server 104 and poses the questions to a human tester at EUT 102 or another computer system co-located with EUT 102, for example, through a Web browser, or at the test server itself. The tester supplies configuration information by answering the questions. Examples of such questions might include, "How many video adapter cards are supported in this model?" or, "How much RAM is supported in this model?" Although the exemplary embodiments presented herein assume that the configuration survey poses questions to a human tester, it would be possible to design a system in which the configuration survey actually looks up the answers to such questions in a database or file.

Still referring to FIG. 1, in exemplary embodiments, the completion of the configuration survey automatically creates a "walkthrough" or walkthrough file, and at least one "kickstart" or kickstart file. In many embodiments, multiple kickstarts are created. In exemplary embodiments, the walkthrough resides at test server 104 and can be viewed at EUT 102. The walkthrough provides instructions to a tester on how to conduct testing, which can include changing the configuration of EUT 102 and installing and/or re-installing the software product and the test software to test various configurations. The walkthrough also provides instructions on which kickstart file to use in the boot process. Generally, a kickstart is a file or collection of data that guides a software installer by providing pre-recorded answers to typical installation questions. The term "kickstart" is commonly associated with text files that are used with specific versions of the Linux operating system. However, for purposes of this disclosure, this term encompasses any file or structure that performs this function. The kickstart files of exemplary embodiments of the present invention also contain a test list, and appropriate instructions to be read by an installer so that the installer downloads or otherwise accesses needed test software.

The results referred to in FIG. 1, which can be stored at the test server, contain both information on whether tests have passed or failed, and a description or descriptions of the various configurations of hardware tested. The results in exemplary embodiments of the invention typically take the form of multiple files, one for each specific hardware configuration tested, however, these results can be combined into one file, and even where they are contained in multiple files, can be transmitted and stored together.

Still referring to FIG. 1, an optional software provider file server 110 is functionally connected to network 106 to communicate with test server 104. In some embodiments, software provider file server can provide updated versions of the test software, configuration survey, and any other software to test server 104. For example, in some situations, a software provider (SP) provides the software to an independent hardware vendor (IHV) who maintains the test server and conducts testing. These updated versions of software can be maintained on fixed or removable storage devices, schematically represented as media 112.

System 100 of FIG. 1 in this exemplary embodiment also includes model-configuration database 114. Model-configuration database 114 can be maintained to record a history of hardware configurations of various models of computer equipment that have been tested. This database can be updated by the test server, or by the test software at the EUT, or by other computing resources maintained by either an IHV or SP. The updates can be made either with or without human intervention. The data on model-configuration database 114 can be used to provide information during a test or when reviewing test results so that re-testing of some configuration options of an EUT can be avoided, for example, when similar options have already been tested on the same or a similar model.

It cannot be overemphasized that FIG. 1 presents only an exemplary embodiment of a system 100 of the invention. The "system" of the invention may in some cases run on a single computing platform or a test server and an EUT connected more directly than would be suggested by FIG. 1 with no other servers or databases. Elements pictured in FIG. 1 may be combined in various ways, or separated by multiple networks.

Those of skill in the art will recognize that a wide variety of types of computer program products and computer programs having various computer program instructions can be used to implement all or portions of embodiments of the present invention. Such computer program products or software implement the invention through the use of systems like those illustrated in FIG. 1 and can take the form of computer program instructions, software modules and the like residing on a computer usable or computer readable storage medium. Note that the medium may also be a stream of information being retrieved when a processing platform or execution system downloads computer program instructions through the Internet or any other type of network. Computer program instructions which implement the invention can reside on or in any medium that can contain, store, communicate, propagate or transport a program for use by or in connection with any instruction execution system, apparatus, or device. Such a medium may be, for example, but is not limited to, an electronic, magnetic, optical, electro-magnetic, or semi-conductor system, apparatus, device, or network. Note that the computer usable or computer readable medium could even be paper or another suitable medium upon which the program is printed, as the program can be electronically captured from the paper, compiled, interpreted, or otherwise processed in a suitable manner.

Those of skill in the art should also appreciate that any programming language can be used to implement an embodiment of the invention. The invention can be implemented in the context of any operating system, including embedded operating systems. Implementation of the invention is possible in many different contexts because embodiments of the invention are sufficiently disclosed to permit one of ordinary skill on the computing arts to implement an embodiment of the invention most suitable to his or her particular needs. As previously noted, an embodiment of the invention can be used to verify the operation of any kind of processing equipment with both operating systems and applications, as well as other types of software.

Figure 2:
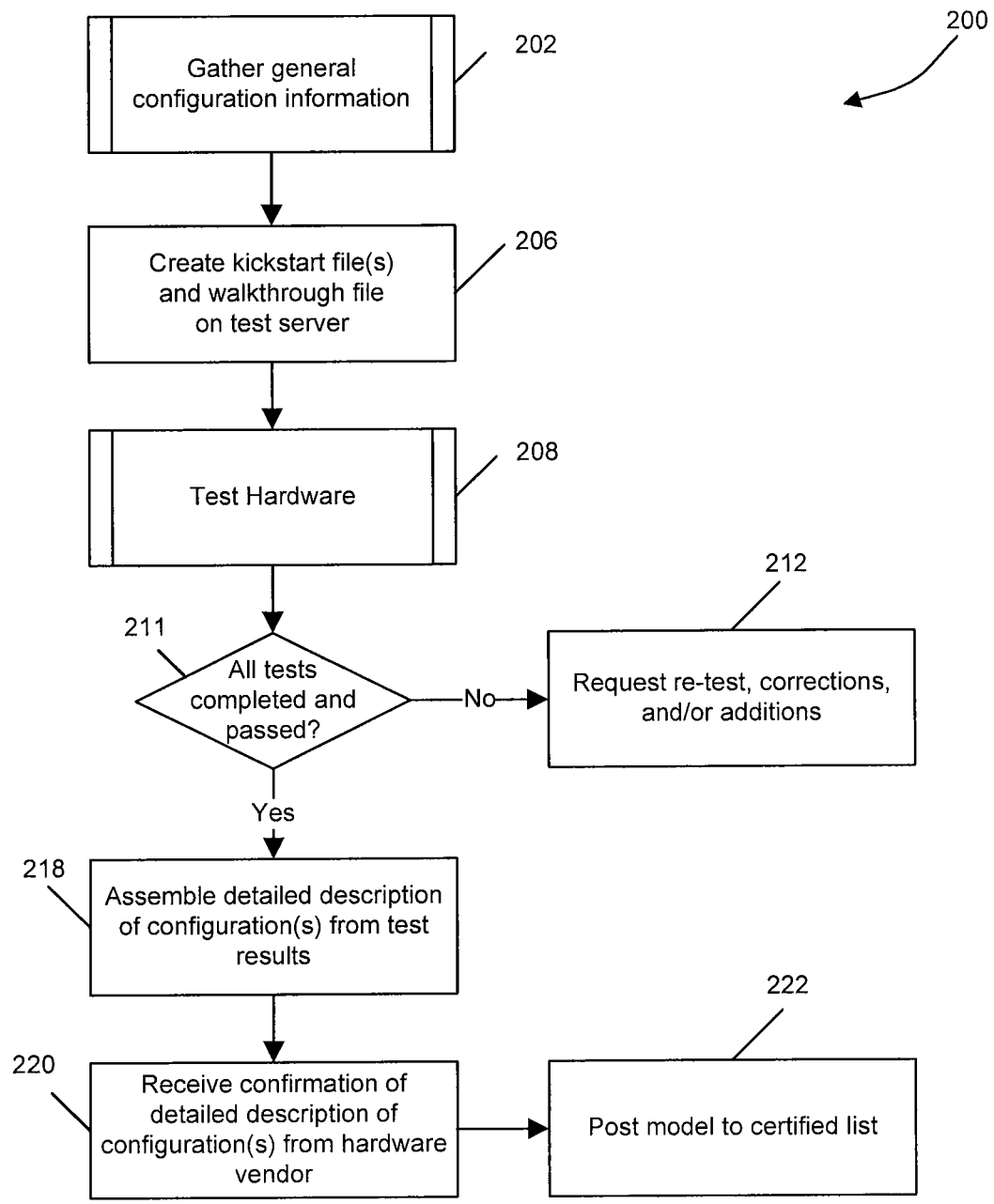
FIG. 2 is a flowchart illustrating an exemplary embodiment of the invention in which no test credit for prior or other testing is provided.

FIG. 2 illustrates process 200 of an exemplary embodiment of the invention. FIG. 2 is presented as a flowchart in which various elements or sub-processes are presented as process blocks. In this embodiment, process 200 begins with gathering general configuration information on the EUT at block 202. Specific subroutines for this block will be discussed later with respect to FIG. 5 and FIG. 6. At block 206, one or more kickstart files and a walkthrough file are created on the test server. In exemplary embodiments, one kickstart file will be created for each installation of the software product, for example, a specific version of an operating system. Each installation corresponds to a particular arrangement of adapters, memory, and other hardware. The walkthrough file instructs a tester how to configure the EUT for each kickstart, and how to boot an installer to install the software product and test software in each case.

Those of skill in the art should readily appreciate that there are many techniques that can be used to generated the kickstart and walkthrough files. In at least some exemplary embodiments, information collected in block 202 of FIG. 2 can be stored in a matrix in the order collected and evaluated to determine how many test runs are needed. The smallest set of test runs that will cover all devices can be determined. Further, the number of test runs can be minimized by testing as many difference types of components and options as possible in each test run. As a specific example, consider a personal computer that can use two different SCSI drive controllers, four different serial ATA drive controllers, three different video cards, and five different network interface cards. Assuming the EUT only supports one of each kind of device at a time, five tests are required, one for each network interface card. If multiple network interface cards at a time are supported in the EUT, the number of test runs can be further reduced. For other devices that do not require as many tests, each new configuration uses the next device of that type from the matrix. Once all devices of that type have been tested, the last device can stay in place for further test runs, and any duplicate tests that occur can be removed later. The above assumes that there are no conflicts between the various devices of different types that prevent a particular device of one type from being installed with a particular device of another type. If there are such conflicts, additional test runs may be needed to cover all devices.

Still referring to FIG. 2, at block 208, the hardware is tested. In exemplary embodiments, each test produces a results file, which includes both test results and a detailed description of the configuration tested. The specifics of a subroutine for block 208 will be discussed later with respect to FIG. 7. At block 211, results files are checked and a determination is made as to whether all required tests were completed and passed. If not, remedial action can be taken at block 212. In exemplary embodiments, either the determination at block 211 may be made or the remedial action at block 212 may be taken with manual intervention, may involve automated tools, or may involve some combination of the two. Remedial action may involve contacting an IHV to request re-testing, corrections, or additions. For example, if required tests failed, or some options were not tested, a re-test or an additional test may be needed to obtain passing test results for the correct hardware. In such cases, the processing of FIG. 2 may return to block 208. Corrections may be necessary if the tester made an error in answering the configuration survey. Such a correction may or may not necessitate a re-test or additional testing. The decision block 211 may involve assigning a number to each test and producing a checksum of the number to verify that all tests have passed. For example, a passing test can be assigned a zero and a failing test can be assigned a one as an indicator. Thus, it could be assumed that a particular configuration passed all tests if the checksum for all test result indicators is zero. Alternatively, the sum of all test indicators can be added to some other checksum, for example the "MD5SUM" (the file content indicator), of the results file to produce a final checksum.

Returning to the exemplary embodiment of FIG. 2, if all tests are completed and passed at block 211, a detailed description of the configuration options of the EUT is assembled at block 218. Block 218 may include removing duplicate tests or otherwise condensing the description. Optionally, as a further verification, for example, in an embodiment where an SP is verifying compatibility of a software product with a representative EUT from an IHV, the configuration information can be confirmed with the IHV at block 220. Such confirmation can head off problems that might arise if the detailed description of the configuration options assembled at block 218 does not match what the vendor actually supports or intended to have covered by the testing. Again, the sub-process of block 220 can include manual or automated operations and could be done on paper, by sending the information to the IHV over a network, or by any other means. At block 222 a certification may be optionally granted to a model of hardware represented by the EUT by posting this information to a certified list of hardware maintained by the SP.

It cannot be overemphasized that references to processes as taking place between an SP and an IHV are made only as an example. The entire process and all servers, software, and hardware involved might be used by a single entity, for example, one that provides both software and hardware. Additionally, software providers and hardware vendors may contract services to each other or to third parties. Thus, the possibilities regarding how and where hardware is located or how and where various processes take place are widely variable.

Figure 3:
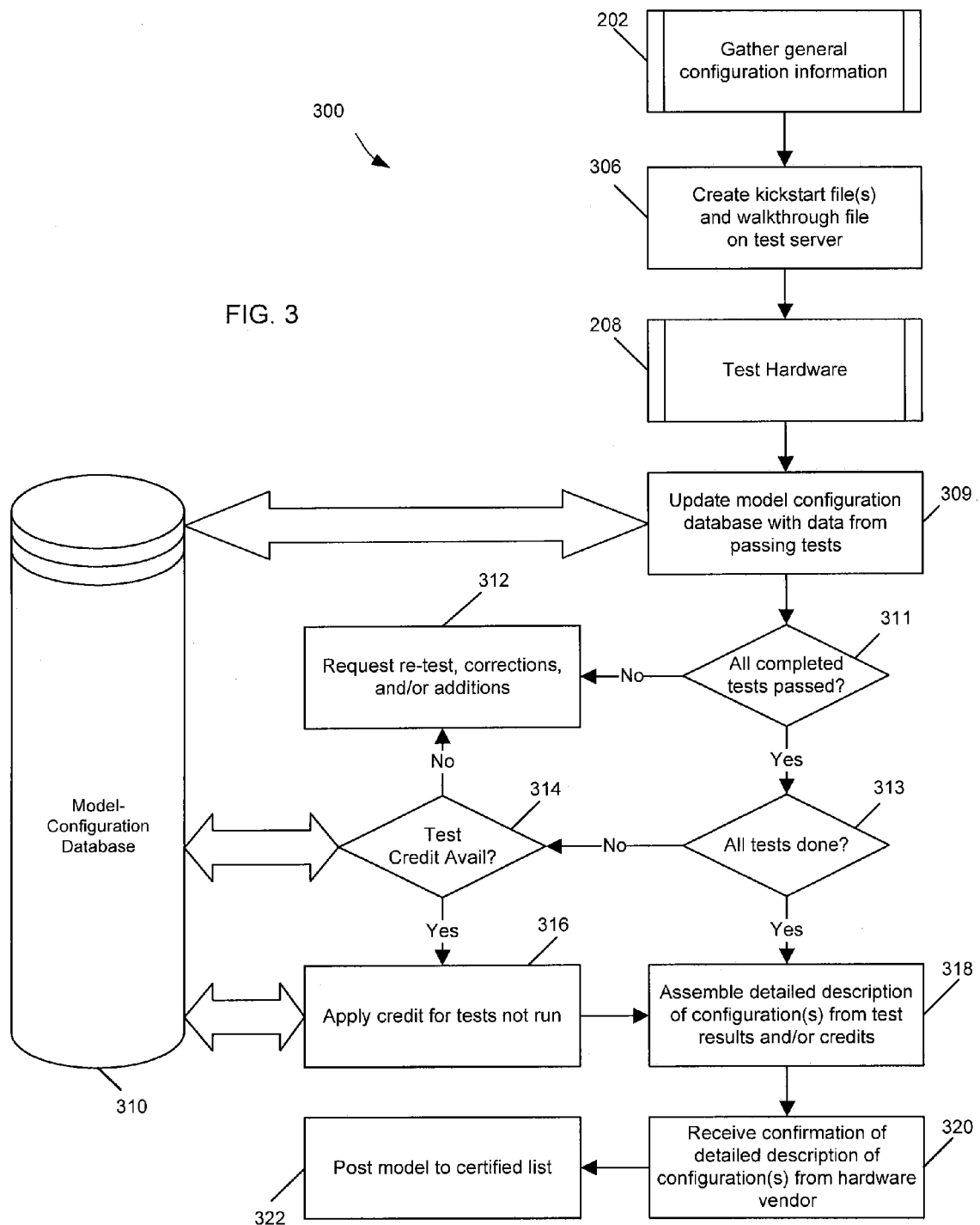
FIG. 3 is a flowchart illustrating another exemplary embodiment of the invention, in which test credit is provided after testing is completed.

FIG. 3 illustrates process 300 of another exemplary embodiment of the present invention. In this example, a model-configuration database is used to maintain a history of testing and provide credit so that not all hardware options have to be tested for each new model of EUT. Again, process 300 is illustrated as a series of process blocks. At block 202, general configuration information is gathered in the same manner as discussed with respect to FIG. 3. At block 306, one or more kickstart files and a walkthrough file are created on the test server as before. In exemplary embodiments, one kickstart file will be created for each installation of the software product. Each installation corresponds to a particular arrangement of adapters, memory, and other hardware. The walkthrough file instructs a tester how to configure the EUT for each kickstart, and how to boot an installer to install the software product and test software in each case. At block 208, the hardware is tested in the same manner as discussed with respect to FIG. 2.

At block 309 of FIG. 3, hardware configuration database 310 is updated with data from the tests that were run at block 208. In at least some exemplary embodiments, this update serves to make a record in the database of passing tests and the hardware devices involved. At block 311, a determination is made as to whether all completed tests have passed. This determination can be made in a manner similar to that discussed previously, either a manual review, or an automated process, for example a process that verifies a checksum. If there are failures, remedial measures can be taken at block 312 as previously discussed. Otherwise, at block 313 a determination is made as to whether all tests, which could have been performed given the configuration options of the EUT were in fact performed. If not, a determination as made at block 314 whether a test credit is available based on the historical information in model-configuration database 310. If not, remedial measures are again taken at block 312. Again, these measures may involve manually or automatically requesting additional testing, corrections, and/or additions. If a test credit is available, it is applied at block 316 based on the information in model-configuration database 310. To apply a test credit for a particular hardware option, which has been detected during the gathering of the configuration information or the testing so that its specifics are now known, the model-configuration database is queried to determine if the same option was previously, successfully tested, or is to be tested elsewhere (for example, by the hardware vendor), in the same or a similar model. If so, a test of that hardware option can be removed from the list of tests that need to be or should have been done. Note that, the software provider may wish to further qualify when a previous test can be used to apply credit, for example, based on the age of the previous test, or the version number of the software product used. Once either all tests have been done and passed and/or a credit has been applied for tests not done, processing continues at block 318, where a detailed description of the configuration options of the EUT is assembled. Optionally, as a further verification, for example, in an embodiment where an SP is verifying compatibility of a software product with a representative EUT from an IHV, the configuration information can be confirmed with the IHV at block 320 to catch errors in the configuration information, as previously discussed with reference to FIG. 2. At block 322, a certification may be optionally granted to a model of hardware represented by the EUT by posting this information to a certified list of hardware.

Figure 4:
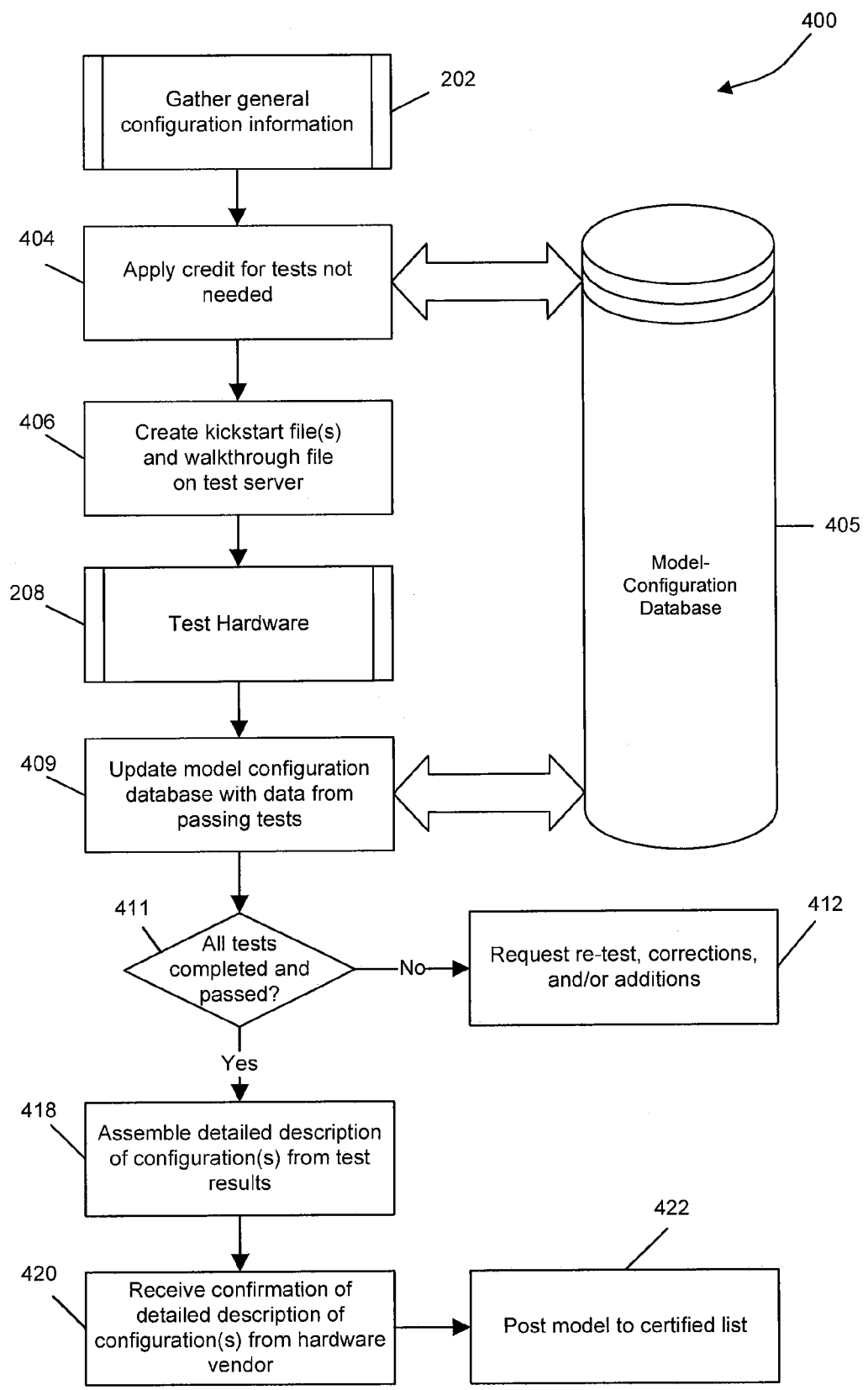
FIG. 4 is a flowchart illustrating another exemplary embodiment of the invention, in which test credit is provided prior to testing.

FIG. 4 is a flowchart diagram that illustrates process 400 according to another exemplary embodiment of the present invention. The embodiment of FIG. 4 also makes use of a model-configuration database to maintain a history of testing and provide credit so that not all hardware options have to be tested for each new model of EUT. In the case of process 400 however, the test credit is applied earlier in the process. It should be noted that it is possible to devise an embodiment of the invention where test credits are applied in various places. Additionally, test credit can be applied based on other criteria and without using a model-configuration database as it is shown herein. For example, an SP may rely on testing that an IHV or some third party does for some hardware devices, and design the test system to provide credit for such other testing so that those tests do not have to be performed as part of the verification process discussed herein.

Returning to FIG. 4, at block 202, general configuration information is gathered in the same manner as discussed with respect to FIG. 3. At block 404, model-configuration database 405 is accessed to provide test credit. To apply a test credit for a particular hardware option, the model-configuration database is queried to determine if the same option was previously, successfully tested, or is to be tested elsewhere, in the same or a similar model. If so a test of that hardware option can be removed from the list of tests that need to be run, subject to any other optional qualifications as previously discussed. In exemplary embodiments, once configuration information is gathered at block 202, tests for certain hardware devices discovered in that process can be removed from test configurations based on previous testing data stored in model-configuration database 405. The specifics of these devices can be discovered during the configuration survey either by having the tester enter such specifics, or by accessing the model configuration database during the survey and presenting a list of possible part numbers or similar identifying information from the database for a given type of adapter or device to the tester. The tester can then select the correct adapter or device from the list, or select an option such as "other—not listed." Alternatively, or in addition, devices currently installed can be determined from a hardware list maintained by the operating system, as discussed in more detail with respect to FIG. 5 and FIG. 6. At block 406, kickstart files and the walkthrough file are created on the test server as before. In a typical environment, one kickstart file will be created for each installation of the software product. Each installation corresponds to a particular arrangement of adapters, memory, and other hardware. The walkthrough file again instructs a tester how to configure the EUT for each kickstart, and how to boot an installer to install the software product and test software in each case. At block 208, the hardware is tested in the same manner as discussed with respect to the previous flowcharts. It should be noted that a test credit can either alternatively or additionally be applied based on hardware specifics discovered during the actual testing process.

Still referring to FIG. 4, at block 409, model-configuration database 405 is updated with data from the tests that were run at block 208. At block 411, results files are checked and a determination is made as to whether all required tests were completed and were passed. If not, remedial action can be taken at block 412. As with similar sub-processes already discussed, either the determination at block 411 or the remedial action at block 412 may be carried out with manual intervention, may involve automated tools, or may involve some combination of the two. The decision block at block 411 may involve assigning a number to each test and producing a checksum of the number to verify that all tests have passed.

Alternatively, the sum of all test indicators can be added to some other checksum, as previously discussed.

Returning to the exemplary embodiment of FIG. 4, if all tests are completed and passed at block 411, a detailed description of the configuration options of the EUT is assembled at block 418. Optionally, as previously discussed, the configuration information can be confirmed at block 420 to catch any errors in the detailed configuration information as previously discussed. Again, the sub-process of block 420 can include manual or automated operations and could be done on paper or over a network. At block 422, a certification may be optionally granted to a model of hardware represented by the EUT by posting this information to a certified list.

Those of skill in the art will appreciate that there are many ways to use the model configuration database discussed above to provide test credit for an EUT with hardware similar to that supported in computer equipment already verified. The similarity of models of computer equipment can be determined based on specific processors types, numbers of processors supported, architecture, front-side bus chips, memory type, maximum memory amount, or other specifics. Electrically identical hardware options can be eliminated from the testing of a model judged the same as or similar to a previously tested model based on these fundamental system components. A model of computer equipment that uses the same drive controller, type of hard drive, and memory type as a similar, previously verified model would not need to have either the hard drive or the memory re-tested as long as neither the maximum size of the hard drive supported nor the maximum amount of memory supported exceeds those maximums for the previously tested model. The same considerations can apply to maximum numbers of devices or adapters supported in a similar model, such as processors, network interface cards, and USB adapters.

FIG. 5 presents an exemplary embodiment of subroutine block 202 as illustrated in the previous flowcharts. Subroutine 202 is an exemplary way to gather configuration information. Process 202a of FIG. 5 begins at block 502 which branches from the other flowcharts as referenced in the legend of block 502. At block 506, a configuration survey is provided to gather configuration information. In exemplary embodiments, this configuration survey may be a script or other program that is accessed via a Web browser. The survey may ask questions about how many of various types of adapters or about maximum amounts of memory or storage supported in the model represented by the EUT. It may be expedient to avoid requesting information about specific part numbers or other details, since this information can be gathered during testing in an automated fashion, from a hardware list that can eventually be built by the operating system of the EUT. An operating system can often retrieve information about connected hardware from the devices themselves. As one example, the pervasive and well-known PCI computer bus supports auto-detection of installed adapters by accessing a device identifier, a vendor identifier, and other information which is stored in registers present in each adapter that meets the PCI standard. Identifiers for various hardware devices are managed, maintained, and made accessible by the standards organization, which promulgates the PCI standard, the PCI Special Interest Group (SIG) of Portland, Oreg., United States. The amount of detail to request in the configuration survey is largely a design choice. At block 510, the configuration survey runs and answers to all the questions are recorded, for example, on the test server. At block 516 processing returns back to the main process in whatever embodiment of the invention is in use.

FIG. 6 presents another exemplary embodiment of subroutine block 202 as illustrated in the previous flowcharts. Process 202b of FIG. 6 begins at block 602 which branches from the other flowcharts as referenced in the legend of block 502. At block 606, a configuration survey is provided to gather configuration information. In exemplary embodiments, this configuration survey may be a script or other program that is accessed via a Web browser. The survey may ask questions about the how many of various types of adapters or about maximum amounts of memory or storage supported in the model represented by the EUT. As before, it may be expedient to avoid requesting information about specific part numbers or other details. This information can be gathered via a hardware list maintained by the operating system as previously discussed. The amount of detail to request in the configuration survey is a design choice.

Still referring to FIG. 6, at block 608, a hardware list for the current test setup is acquired from the operating system, and configuration information is pre-populated. In other words, some specifics are recorded without having to ask the tester questions and before testing. At block 610, the configuration survey runs so that any remaining information can be recorded. Thus, the configuration survey can permit information about various hardware options to be gathered even though those hardware options are not presently installed in the EUT. At block 616, processing returns back to the main process flow in whatever embodiment of the invention is in use.

Figure 7:
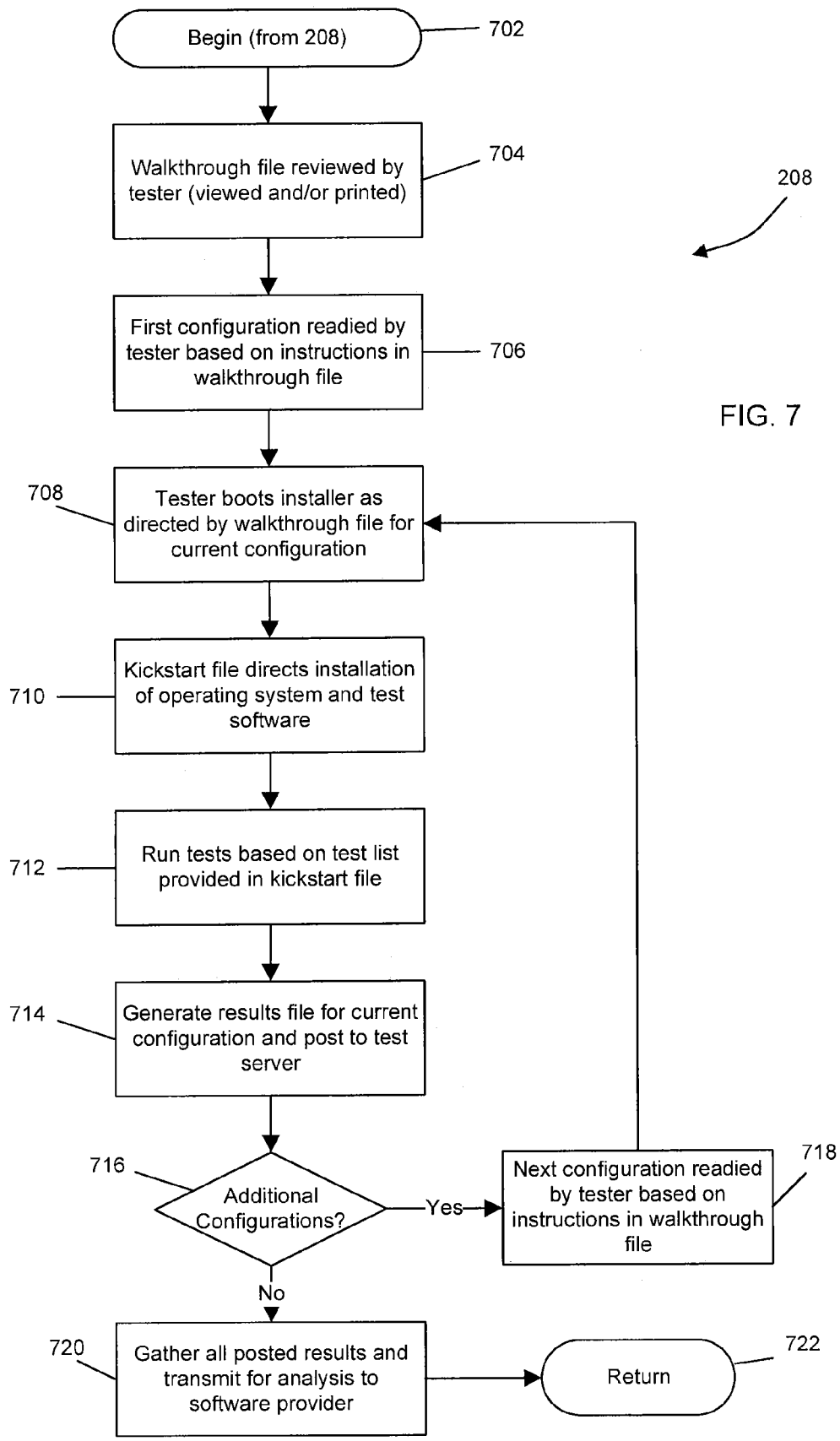
FIG. 7 is a flowchart illustrating a testing process according to some exemplary embodiments of the invention.

FIG. 7 illustrates an exemplary embodiment of subroutine process 208 as referenced in some of the previous flowcharts. Test process 208 begins at block 702 as shown. At block 704, the walkthrough is reviewed by a tester. In case the tester does not wish to memorize all the instructions, the walkthrough file can be printed, or viewed on another computer system co-located with the EUT. At block 706 the first hardware configuration is readied by the tester. This process may involve plugging in appropriate adapter cards or other devices. Alternatively, the system may have been started to view the walkthrough with the appropriate options already installed, in which case block 706 may involve simply re-starting the EUT. At block 708, the tester boots an installer program for the current configuration as directed by the walkthrough instructions. At block 710, the kickstart file for the current configuration directs the installation of the software product, for example purposes a version of an operation system for the model of computer equipment represented by the EUT. The kickstart file also directs the downloading of test software from the test server. At block 712, hardware tests are run based on a test list in the kickstart file. At block 714, a results file is generated for the current configuration and posted to the test server.

At block 716 of FIG. 7, a check is made as to whether there are other configurations to test. If so, the next configuration is readied by the tester at block 718, and processing returns to block 708, where the tester boots the installer again. If testing is complete at block 716, processing continues to block 720, where all posted results are gathered and transmitted for analysis, for example to the software provider. In exemplary embodiments, these results can be contained in files, one for each configuration tested, and they are transmitted to a software provider by a hardware vendor.

Specific embodiments of an invention are described herein. It should be apparent to one of ordinary skill in the computing and networking arts that other embodiments can be implemented and that any embodiment can include features and elements in addition to those which may correspond to what has been described herein. Thus, the following claims do not limit the scope of the invention to the any of specific embodiments described above.

What is claimed is:

1. A method of verifying compatibility of computer equipment with a software product, the method comprising:
- gathering configuration information by a test server, the configuration information defining a plurality of configurations supported by the computer equipment;
- creating at least one file based on the configuration information, the at least one file comprising a walkthrough file to coordinate repeatedly configuring, booting, and testing the computer equipment;
- receiving results of the testing for the plurality of configurations supported by the computer equipment; and
- making available by the test server the results of the testing and a description of the plurality of configurations to enable verification of the compatibility of the computer equipment with the software product.

2. The method of claim 1 further comprising generating the description of the plurality of configurations of the computer equipment from the results.

3. The method of claim 2 further comprising confirming the description of at least some of the plurality of configurations of the computer equipment with a vendor of the computer equipment.

4. The method of claim 1 wherein the at least one file further comprises a kickstart file.

5. The method of claim 1 further comprising applying test credit to reduce the testing of the computer equipment.

6. The method of claim 5 wherein the test credit is applied before the testing.

7. The method of claim 5 wherein the test credit is applied during the testing.

8. The method of claim 5 wherein the test credit is applied after the receiving of the results.

9. The method of claim 5 further comprising updating a configuration database based on the results for use in providing a test credit for future tests.

10. The method of claim 1 wherein the gathering of the information about the plurality of configurations comprises executing a configuration survey to question a tester about the plurality of configurations.

11. The method of claim 1 wherein the gathering of information about the plurality of configurations comprises acquiring a hardware list from an operating system executing on the computer equipment.

12. The method of claim 1 wherein the walkthrough file specifies a kickstart file for each of the plurality of configurations.

13. The method of claim 12 wherein the kickstart file directs the installation of the software product and test software.

14. The method of claim 1 wherein the software product comprises an operating system.

15. The method of claim 13 wherein the software product comprises an operating system.

16. A non-transitory machine readable storage medium having computer-executable instructions for performing the method of claim 1.

17. A system operable for performing the method of claim 1.

18. The method of claim 1 wherein the gathering of information takes place at the computer equipment.

19. The method of claim 1 wherein the gathering of information takes place at the test server.

20. The method of claim 1 wherein the making available of the results comprises transmitting the results to a software provider.

21. The method of claim 1 wherein the gathering of the information takes place at the computer equipment and the making available of the results comprises transmitting the results to a software provider.

22. Apparatus for verifying compatibility of computer equipment with a software product, the apparatus comprising:
- means for gathering configuration information by a test server, the configuration information defining a plurality of configurations supported by the computer equipment;
- means for creating at least one file based on the configuration information, the at least one file comprising a walkthrough file to coordinate repeatedly configuring, booting, and testing the computer equipment;
- means for receiving results of the testing for the plurality of configurations supported by the computer equipment; and
- means for verifying the compatibility of the computer equipment with the software product based on the results and a description of the plurality of configurations.

23. The apparatus of claim 22 further comprising means for generating the description of the computer equipment from the results.

24. The apparatus of claim 22 further comprising means for confirming the description of the plurality of configurations with a vendor of the computer equipment.

25. The apparatus of claim 22 further comprising means for applying test credit to reduce the testing of the computer equipment based on prior tests.

26. The apparatus of claim 25 further comprising means for updating a configuration database based on the results and the description for use in providing a test credit for future tests.

27. A method of testing computer equipment for compatibility with a software product, the method comprising:
- configuring the computer equipment in accordance with a walkthrough generated by a test server using a configuration survey;
- booting an installer by the computer equipment as directed by the walkthrough to cause loading of the software product and test software;
- testing the computer equipment to generate a results file;
- repeating the configuring, booting, and testing for each of a plurality of hardware configurations supported by the computer equipment; and
- transmitting the plurality of results files for analysis.

28. The method of claim 27 wherein the software product comprises an operating system.

29. A system operable to orchestrate the method of claim 27.

30. The method of claim 27 wherein the plurality of results files are transmitted to a software provider.

31. The method of claim 28 wherein the plurality of results files are transmitted to a software provider.

32. A method of verifying compatibility of computer equipment with a software product, the method comprising:
- providing a configuration survey from a server to gather configuration information about plurality of configurations supported by computer equipment;
- providing software that is capable of creating at least one file based on the configuration information from the configuration survey, the at least one file comprising a walkthrough file to coordinate repeatedly configuring, booting and testing the computer equipment;

providing test software to enable the testing; and
receiving results of the testing.

33. The method of claim 32 further comprising receiving a description of the plurality of configurations to enable verification of the compatibility of the computer equipment with the software product.

34. The method of claim 32 further comprising generating the description of the computer equipment from the results.

35. The method of claim 34 further comprising confirming the description of the computer equipment with a vendor of the computer equipment.

36. The method of claim 32 wherein the at least one file further comprises a kickstart file.

37. The method of claim 32 further comprising providing access to a configuration database to enable applying a test credit to reduce the testing of the computer equipment.

38. The method of claim 32 wherein the providing of the software that is capable of creating at least one file comprises providing software that is capable of generating a plurality of files.

39. The method of claim 37 further comprising updating a configuration database based on the results for use in providing the test credit for future tests.

40. The method of claim 32 wherein at least one of the test software and the configuration survey accesses a hardware list maintained by an operating system executing on the computer equipment.

41. The method of claim 32 wherein at least one of the configuration survey and the test software are provided to an independent hardware vendor.

42. The method of claim 32 wherein at least one of the configuration survey and the test software are provided to the computer equipment.

43. The method of claim 32 further comprising providing the software product.

44. A non-transitory machine readable storage medium having computer-executable instructions for performing the method of claim 32.

45. A system operable for performing the method of claim 32.

* * * * *